United States Patent [19]

Schwarz

[11] Patent Number: 4,826,910

[45] Date of Patent: May 2, 1989

[54] OIL RESISTANT THERMOPLASTIC ELASTOMER

[75] Inventor: Herbert F. Schwarz, Sarnia, Canada

[73] Assignee: Polysar Limited, Sarnia, Canada

[21] Appl. No.: 119,099

[22] Filed: Nov. 10, 1987

[51] Int. Cl.$^4$ .............................................. C08L 67/04
[52] U.S. Cl. ................................. 524/521; 524/151; 524/153; 524/513; 525/166; 525/186
[58] Field of Search ............... 525/166, 186; 524/521, 524/151, 153

[56] References Cited

U.S. PATENT DOCUMENTS

| | | |
|---|---|---|
| 3,037,954 | 6/1962 | Gessler et al. |
| 3,419,511 | 12/1968 | Condo et al. ............... 524/521 |
| 3,613,613 | 10/1971 | Loritz et al. ............... 524/521 |
| 4,438,230 | 3/1984 | Schwarz. |
| 4,594,367 | 6/1986 | Geissel et al. ............ 524/521 |
| 4,619,971 | 10/1986 | Yates, III et al. ......... 525/166 |

FOREIGN PATENT DOCUMENTS

| | | | |
|---|---|---|---|
| 1063736 | 8/1959 | Fed. Rep. of Germany ...... | 525/166 |
| 2650258 | 5/1978 | Fed. Rep. of Germany ...... | 525/166 |

*Primary Examiner*—Lewis T. Jacobs
*Assistant Examiner*—David W. Woodward
*Attorney, Agent, or Firm*—Stevens, Davis, Miller & Mosher

[57] ABSTRACT

The present invention provides a process to prepare an oil resistant thermoplastic elastomer composition which contains carboxylated nitrile rubber, polyvinyl chloride and polycaprolactone.

3 Claims, No Drawings

OIL RESISTANT THERMOPLASTIC ELASTOMER

FIELD OF THE INVENTION

This invention relates to an oil resistant thermoplastic elastomer composition which contains carboxylated nitrile rubber, polyvinyl chloride and polycaprolactone.

BACKGROUND OF THE INVENTION

Thermoplastic elastomer compositions are well known. Such compositions have a high melt flow property that allows them to be processed as thermoplastic materials, yet they also demonstrate certain rubbery characteristics.

U.S. Pat. No. 3,037,954 teaches a process to prepare a thermoplastic elastomer in which polypropylene and a rubber are subjected to "dynamic curing conditions". The examples of the patent illustrate that the products produced according to the patent demonstrate the properties of thermoplastic elastomers.

Simple blends of carboxylated nitrile rubber and polyvinyl chloride are also known. The blends are somewhat thermoplastic and are used in many molding applications. However, these blends do not typically exhibit the balance between rubbery properties and thermoplastic properties which is characteristic of thermoplastic elastomers.

More recently, flux blends of carboxylated nitrile rubber, polyvinyl chloride and nylon have been developed, as disclosed in U.S. Pat. No. 4,438,230. Vulcanizates of these blends are especially useful in applications where high tensile strength and retention of properties after ageing are required. The vulcanizates are somewhat rubbery, as illustrated by their relatively low compression set, but they do not exhibit the high melt flow of a thermoplastic.

It is an object of the present invention to provide a process to prepare an oil resistant, thermoplastic elastomer composition having a good balance between compression set and melt flow index properties.

SUMMARY OF THE INVENTION

The present invention provides a process for preparing an oil resistant thermoplastic elastomer composition comprising admixing
(i) from 20 to 50 weight percent carboxylated nitrile rubber
(ii) from 20 to 50 weight percent polyvinyl chloride
(iii) from 5 to 30 weight percent polycaprolactone, such that the total of (i), (ii) and (iii) is 100 weight percent
(iv) from 0.2 to 10 parts by weight peroxy curing agent
(v) from 3 to 10 parts by weight coagent for the peroxy curing agent
(vi) from 1 to 4 parts by weight stabilizer
(vii) from 0.2 to 4 parts by weight antioxidant,
the admixing being at a temperature above the activation temperature of the peroxy curing agent, for a sufficient length of time to cause admixing and vulcanization but not to cause significant thermal degradation of components (i), (ii) or (iii).

DETAILED DESCRIPTION

The thermoplastic elastomer compositions produced according to the process of the present invention exhibit good oil resistance and a good balance between compression set and melt flow index properties. The polyvinyl chloride used in the present invention may be any polyvinyl chloride resin known in the art. However, it is preferred to use a low molecular weight polyvinyl chloride which provides easy processing. Polyvinyl chloride sold under the trade name Esso PVC 360 by Esso Chemical Canada has been found to provide satisfactory results when used in the present invention.

The carboxylated nitrile rubber used in the present invention may be any of those known in the art. These are copolymers of butadiene, acrylonitrile and one or more $\alpha,\beta$ unsaturated carboxylic acids. The carboxylic acids may contain one or more carboxylic groups. Because of cost and availability, it is preferred that the carboxylic acids be selected from acrylic, methacrylic, fumaric, maleic and itaconic acids. The copolymers may be prepared by the well known emulsion free radical process. The acrylonitrile content of the copolymer may be from about 20 to about 40 percent by weight. The total content of the carboxylic acid in the copolymer may be from about 0.5 to about 10 percent by weight. Butadiene forms the balance to 100 weight percent of the copolymer.

The viscosity of the carboxylated nitrile rubber is generally within the Mooney range ($M_L$ 1+4 at 100° C.) of from about 40 to about 80. The polycaprolactone is a linear polyester which is formed by a ring opening polymerization of epsilon-caprolactone monomer. The polymer contains repeat units of the structure:

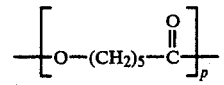

where p is at least 100 but not more than 3000. Such polymers, and methods of their production, are well known to persons skilled in the relevant art.

It is a conventional practice to quantitatively define polymer blends on the basis of the weight percent of the polymer components, excluding other additives. Accordingly, the process of the present invention relates to a polymer composition which contains 20 to 50 weight percent carboxylated nitrile rubber polymer, 20 to 50 weight percent polyvinyl chloride polymer and 5 to 30 weight percent polycaprolactone polymer, with the term "weight percent" meaning exclusive of the weight of the other additives. Compositions which comprise 35 to 45 weight percent carboxylated nitrile rubber, 35 to 45 weight percent polyvinyl chloride and 10 to 20 weight percent polycaprolactone are preferred.

The process of the present invention requires the use of a peroxy curing agent. The term "peroxy curing agent" as used herein is meant to refer to the well known peroxide and hydroperoxide curing agents.

Any of the conventional peroxy curing agents may be employed, including dicumyl peroxide, tertiary butyl peroxy benzoate, cumene hydroperoxide, 2,5 dimethyl-2,5 di(benzoyl peroxy) hexane, and benzoyl peroxide. The amount of peroxy curing agent should be from about 0.2 to 10 "parts by weight", wherein the term parts by weight refers to its conventional meaning, namely parts by weight per 100 parts by weight of total polymer. The preferred amount will depend upon the specific type of peroxy curing agent chosen. Skilled persons will be able to readily optimize curatives, using small scale experiments with less than 100 grams of polymer.

The process of the present invention also requires the use of a crosslinking coagents. Any of the coagents which may be employed in peroxy curing reactions are suitable for use in the present invention. Examples of such coagents include triethylene glycol dimethacrylate, trialkyl cyanurate, trialkyl phosphate, ethylene dimethacrylate, 1.2 polybutadiene, zinc acrylate and tetrahydrofurfuryl methacrylate. The amount of the coagent is from 3 to 20 parts by weight, preferably 5 to 10 parts by weight. Mixtures of more than one coagent may also be employed.

The stabilizers used in the present invention may be one or more of the commercially available metal salts, organo metallic salts or soaps or organometallic compounds which are well known in the art. These stabilizers are frequently sold on a propietary basis, with their exact chemical composition not being disclosed. A description of available stabilizers which are used with PVC is given in Chapter 9 of "Encyclopedia of PVC", edited by L. I. Nass and published by Marcel Dekker Inc. Using the classification scheme described therein, suitable stabilizers for use in the present invention include lead salts, mixed metal salts, organotin stabilizers and organonickel stabilizers. Preferred stabilizers include the mixed metal salts of barium/cadmium, barium/cadmium/zinc, and barium/zinc and the organotin stabilizers. The total amount of stabilizers in a polymer blend for use in the process of the present invention is from about 1.0 to 4 parts by weight, preferably from about 1.5 to 3 parts by weight.

The antioxidants for use in the present invention may be one or more of any of the antioxidants which are used in the art of compounding heat resistant, carboxylated nitrile rubber. Suitable antioxidants include p-cumyldiphenylamide, octylated diphenylamine, polymerized 1,2 dihydro-2,2,4-trimethylquinoline, nickel salts of dibutyl- and dimethyl-dithiocarbamate, mercaptobenzimidazole and its zinc salts 2-mercaptobenzimidazole and its zinc salts, tris(nonylated phenyl)-phosphite, p-phenylenediamine derivatives, and hindered phenolic antioxidants such as thiodiethylene bis(3,5-di-t-butyl-4-hydroxy)hydro cinnamate. The total amount of antioxidats used in compositions of the present invention is from about 0.2 to 4 parts by weight. A mixture of more than one antioxidant may be used.

The compositions prepared according to the present invention may optionally include further additives such as, for example, pigments, fillers, extender oils such as dioctyl phthalate and processing aids. The process of the invention is carried out by mixing the components in ordinary mixing equipment, such as mill roll mixers, banbury mixers, and screw mixers. The mixture is heated and kneaded at a temperature above the activation temperature of the peroxide. The temperature must be above the activation temperature of the peroxide in order for the dynamic curing reaction to proceed.

It is well known to skilled persons that excessive heat may degrade the polymers which are utilized in the process of the present invention. Therefore, the mixing process should not exceed about 210° C. The polymer composition is preferably mixed at a temperature of from about 145° to about 180° C., especially from about 160° to about 170° C.

Preferred mixing times are from about 2 to about 30 minutes, especially from about 3 to about 10 minutes.

The present invention is illustrated by the following, non-limiting examples.

EXAMPLE 1

In this and the following examples, the polymers used are identified in Table 1. The figures given are percent by weight.

TABLE 1

| | |
|---|---|
| PVC | A polyvinyl chloride sold under the trade name Esso PVC 360 by Esso Chemical Canada. |
| XNBR | A carboxylated nitrile rubber containing about 29 percent acrylonitrile and about 7 percent carboxylic acid. |
| PP | A polypropylene resin sold under the trade name Himont 6331. |
| SB | A block styrene-butadiene polymer sold under the trade name Kraton TR 1101. |
| PolyCap | A polycaprolactone sold under the trade name CAPA 601P |
| EVA | An ethylene-vinyl acetate resin sold under the trade name Elvax 150. |

Dynamically vulcanized compositions were prepared using the following procedure. Mixing was carried out in a labaoratory scale banbury mixer at 77 rpm. The ingredients shown in Table 2 were loaded at zero minutes with the banbury at a temperature of 82° C. and the heating steam on. Mixing was initiated and continued for a total time of 5–6 minutes. At a time when the mixing chamber temperature reached about 149° C., the ram was lifted and the banbury was brushed down. The dynamically cured compositions were dumped and sheeted using a laboratory mill mixer at a roll temperature of 120° C. The stock was then removed from the mill and allowed to cool.

Cooled stock was then comminuted in a dicing machine and fed to an injection molding machine. Injection molding was completed in a 50 ton press machine, using the following conditions:
  locking pressure: 900 psi
  injection pressure: 400 psi
  Front zone temperature: 300° F.
  Feed zone temperature: 270° F.

Dumbbell shaped samples were molded. Physical testing was carried out on the molded samples, according to ASTM D2240-81 (hardness); ASTM D412-80 (modulus, tensile strength and elongation); ASTM D395-78, at 70° C. (compression set), ASTM D1238 at 190° C. and 298.2 kPa (melt flow index) and ASTM D471-79 (fuel resistance).

Comparative experiment 1 illustrates a dynamically vulcanized blend containing PVC and carboxylated nitrile rubber. The compression set of the composition is good. However, the melt flow index is fairly low. Accordingly, the vulcanized composition of comparative experiment 1 may be characterized as being elastomeric, but it should not be regarded as a thermoplastic elastomer.

Inventive experiment 2 illustrates a dynamically vulcanized composition which displays a good balance between melt flow index and compression set. Thus, the physical properties of the composition of experiment 2, especially compression set, suggest a rubbery composition. In addition, the melt flow index shows that the composition may be readily molded or extruded.

TABLE 2

| Experiment | 1 | 2 |
|---|---|---|
| Polymer Ingredients (weight percent) | | |
| XNBR | 40 | 40 |
| PVC | 40 | 40 |

TABLE 2-continued

| Experiment | 1 | 2 |
|---|---|---|
| PolyCap | — | 20 |
| Additives (parts by weight) | | |
| Dicumyl peroxide | 0.5 | 0.5 |
| Tetrahydrofurfuryl methacrylate | 10 | 10 |
| Zinc acrylate | 4 | 4 |
| Di octyl phthalate | 25 | 25 |
| oi (butoxy-ethoxy-ethyl) formal | 15 | 15 |
| epoxidized soya bean oil | 5 | 5 |
| barium/cadmium stabilizer | 2.5 | 2.5 |
| zinc salt of 2-mercaptobenzimidazole | 1.5 | 1.5 |
| tris (nonylated phenyl) phosphite | 0.5 | 0.5 |
| thiodicthylene bis-(3,5-di-tert-butyl-4-hydroxy) hydrocinnamate | 0.5 | 0.5 |
| calcium stearate | 1.0 | 1.0 |
| Melt Flow Index (g/10 min.) | 5.7 | 29.3 |
| Physical Properties | | |
| Hardness (Sore A) | 67 | 71 |
| 100 modulus (MPa) | 3.9 | 3.0 |
| Tensile Strength (MPa) | 12.8 | 6.8 |
| Elongation at break (%) | 340 | 270 |
| Compression set (% after 70 hrs at 70° C.) | 60 | 54 |
| Aged in AST "Fuel C" (70 hrs at 23° C.) | | |
| Hardness | 53 | 57 |
| 100% modulus | 2.7 | 2.2 |
| Tensile Strength | 9.6 | 6.4 |
| Elongation at break | 330 | 320 |
| % volume change | 9 | 9 |

EXAMPLE 2

This example illustrates the dynamic vulcanization of compositions which contain polyvinyl chloride, carboxylated nitrile rubber and a third resin.

The compositions of Table 3 were prepared according to the mixing procedures of example 1.

The composition of comparative experiment 10 contains SB copolymer and exhibits a relatively low melt flow index.

The compositions of comparative experiments 11 and 13 utilize 20 weight percent polypropylene and ethylene-vinyl acetate, respectively. Both compositions have an excellent melt flow index. However, the compression set of both compositions is higher than the compression set of the composition of inventive experiment 12.

The composition of inventive experiment 12 demonstrates a good balance between melt flow index and compression set.

TABLE 3

| Experiment | 10 -C | 11 -C | 12 | 13 -C |
|---|---|---|---|---|
| Polymer Ingredients (weight percent) | | | | |
| XNBR | 40 | 40 | 40 | 40 |
| PVC | 40 | 40 | 40 | 40 |
| SB | 20 | — | — | — |
| PP | — | 20 | — | — |
| Polycap | — | — | 20 | — |
| EVA | — | — | — | 20 |
| Additives (parts by weight) | | | | |
| Dicumyl peroxide | 0.5 | 0.5 | 0.5 | 0.5 |
| Tetrahydrofurfuryl methacrylate | 10 | 10 | 10 | 10 |
| Zinc acrylate | 4 | 4 | 4 | 4 |
| Dioctylphthalate | 25 | 25 | 25 | 25 |
| Di (butoxy-ethoxy-ethyl) formal | 15 | 15 | 15 | 15 |
| epoxidized soya bean oil | 5 | 5 | 5 | 5 |
| barium/cadmium stabilizer | 2.5 | 2.5 | 2.5 | 2.5 |
| zinc salt of 2-mercaptobenzimidazole | 1.5 | 1.5 | 1.5 | 1.5 |
| tris (nonylated-phenyl) phosphite | 0.5 | 0.5 | 0.5 | 0.5 |
| calcium stearate | 1.0 | 1.0 | 1.0 | 1.0 |
| thiodiethylene bis-3,5-di-tert-butyl-hydroxy hydrocinnamate | 0.5 | 0.5 | 0.5 | 0.5 |
| Melt Flow Index (g/10 min) | 2.1 | >80 | 34.9 | 81.8 |
| Physical Properties | | | | |
| Hardness (Shore A) | 59 | 80 | 71 | 64 |
| 100% Modulus (MPa) | 2.3 | — | 3.2 | 2.7 |
| Tensile Strength (MPa) | 3.9 | 3.9 | 10.6 | 5.4 |
| Elongation at Break (%) | 190 | 60 | 360 | 220 |
| Compression set (% after 70 hrs at 70° C.) | 58 | 65 | 47 | 56 |
| Aged in ASTM "Fuel C" (70 hrs at 23° C.) | | | | |
| Hardness | 36 | 67 | 45 | 38 |
| 100% modulus | 1.7 | 2.4 | 1.7 | 1.5 |
| Tensile Strength | 1.7 | 2.6 | 7.2 | 2.2 |
| Elongation at Break | 100 | 120 | 320 | 150 |
| % volume change | 45 | 10 | 15 | 23 |

-C: comparative

EXAMPLE 3

This example illustrates the effect of using different amounts of peroxy curing agent.

Comparative experiment 20 was performed without any peroxide. Although the melt flow index of the resulting composition is excellent, the compression set is quite poor.

TABLE 4

| Experiment | 20 | 21 | 22 |
|---|---|---|---|
| | | (comparative) | |
| Polymer Ingredients (weight percent) | | | |
| XNBR | 40 | 40 | 40 |
| PVC | 40 | 40 | 40 |
| Additives (parts by weight) | | | |
| Polycap | 20 | 20 | 20 |
| Dicumyl peroxide | — | 0.5 | 1.0 |
| Tetrahydrofurfuryl methacrylate | 10 | 10 | 10 |
| Zinc acrylate | 4 | 4 | 4 |
| Dioctyl phtalate | 25 | 25 | 25 |
| Di(butoxy-ethoxy-ethyl) formal | 15 | 15 | 15 |
| Epoxidized soya bean oil | 5 | 5 | 5 |
| barium/cadmium stabilizer | 2.5 | 2.5 | 2.5 |
| zinc salt of 2-mercaptobenzimidazole | 1.5 | 1.5 | 1.5 |
| tris nonylated phenyl phosphite | 0.5 | 0.5 | 0.5 |
| calcium stearate | 1.0 | 1.0 | 1.0 |
| thiodiethylene bis-(3,5-di-tert-butyl-4-hydroxy) hydrocinnamate | 0.5 | 0.5 | 0.5 |
| Melt Flow Index (g/10 min) | 43.8 | 29.3 | 19.5 |
| Physical Properties | | | |
| Hardness ("Shore A") | 68 | 71 | 71 |
| 100% modulus (MPa) | 1.9 | 3.0 | 3.3 |
| Tensile Strengrh (MPa) | 5.9 | 6.8 | 8.8 |
| Elongation at Break (%) | 550 | 270 | 310 |
| Compression set (% after 70 hrs at 70° C.) | 71 | 60 | 54 |
| Aged in ASTM "Fuel C" (70 hrs at 23° C.) | | | |
| Hardness (Shore A) | 43 | 57 | 54 |
| 100% modulus (MPa) | 1.3 | 2.2 | 2.4 |
| Tensile Strength (MPa) | 4.9 | 6.4 | 6.1 |
| Elongation at Break (%) | 620 | 320 | 280 |
| % volume change | 10 | 9 | 8 |

What is claimed is:

1. A vulcanizate comprising
   (i) from 20 to 50 parts by weight carboxylated nitrile rubber and,
   (ii) from 20 to 50 parts by weight polyvinyl chloride, and
   (iii) from 5 to 30 parts by weight polycaprolactone, such that the total of said (i), said (ii) and said (iii) is 100 parts by weight, and (iv) from 0.2 to 10 parts by weight peroxy curing agent,
(v) from 3 to 10 parts by weight coagent for said peroxy curing agent,
(vi) from 1 to 4 parts by weight stabilizer, and
(vii) from 0.2 to 4 parts by weight antioxidant, wherein said vulcanizate is obtained by admixing at a temperature above the actuation temperature of said peroxy curing agent, for a sufficient length of time to cause admixing and vulcanization but not cause significant thermal degradation of said carboxylated nitrile rubber, said polyvinyl chloride or said polycaprolactone.

2. The vulcanizate of claim 1 wherein said carboxylated nitrile rubber is a copolymer of butadiene, acrylonitrile and one or more $\alpha,\beta$ unsaturated carboxylic acids selected from the group consisting of methacrylic, fumaric, maleic and itaconic acids.

3. The vulcanizate of claim 1 wherein said peroxy curing agent is dicumyl peroxide and said coagent is a mixture of tetrahydrofurfuryl methacrylate and zinc methacrylate.

* * * * *